(12) United States Patent
Hayashi et al.

(10) Patent No.: US 11,872,922 B1
(45) Date of Patent: Jan. 16, 2024

(54) BEVERAGE CONTAINER HOLDER ASSEMBLY FOR VEHICLE

(71) Applicant: Honda Motor Co., Ltd., Tokyo (JP)

(72) Inventors: Kaz Hayashi, Revelstoke (CA); Takeshi Kamiyama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/946,020

(22) Filed: Sep. 15, 2022

(51) Int. Cl.
  *B60N 3/10* (2006.01)
  *B60H 1/00* (2006.01)
  *F25D 31/00* (2006.01)

(52) U.S. Cl.
  CPC ......... *B60N 3/104* (2013.01); *B60H 1/00271* (2013.01); *B60H 1/00592* (2013.01); *F25D 31/007* (2013.01); *F25D 2331/805* (2013.01); *F25D 2331/809* (2013.01)

(58) Field of Classification Search
  CPC ............................ B60N 3/104; B60H 1/00592; B60H 1/00271; B60H 2001/00214; F25D 31/006; F25D 31/007; F25D 2331/803; F25D 2331/805; F25D 2331/809
  See application file for complete search history.

(56) References Cited

U.S. PATENT DOCUMENTS

| | | | | |
|---|---|---|---|---|
| 4,478,052 A | * | 10/1984 | McDowell | B60N 3/104 62/244 |
| 4,653,289 A | * | 3/1987 | Hodgetts | B60N 3/104 62/239 |
| 4,892,138 A | * | 1/1990 | Bibik, Jr. | B60N 3/104 165/41 |
| 5,165,646 A | * | 11/1992 | Gewecke | B60N 3/103 165/80.1 |
| 5,794,683 A | * | 8/1998 | Kutzner | B60H 1/00592 165/41 |
| 6,560,983 B1 | * | 5/2003 | Schimmeyer | B60N 3/103 248/311.2 |
| D695,881 S | * | 12/2013 | Aldana | D23/324 |
| 10,232,785 B1 | | 3/2019 | Mullen et al. | |
| 2008/0149300 A1 | * | 6/2008 | Matsukawa | B60H 1/00592 165/43 |

(Continued)

FOREIGN PATENT DOCUMENTS

| | | | | |
|---|---|---|---|---|
| DE | 102010000802 A1 | * | 7/2011 | ........... B60H 1/3442 |
| JP | 2006327520 | | 12/2006 | |

(Continued)

*Primary Examiner* — Joseph F Trpisovsky
(74) *Attorney, Agent, or Firm* — JCIP GLOBAL INC.

(57) ABSTRACT

A beverage container holder assembly is adapted to be utilized in a vehicle for accommodating a beverage container. The beverage container holder assembly includes a duct pipe and a container holder. The duct pipe is disposed in front of an instrument panel of the vehicle and extended along a direction perpendicular to a front-rear direction of the vehicle. A first end of the duct pipe is connected to an air conditioner. The container holder is connected to a second end of the duct pipe opposite to the first end. The container holder has a recessed pocket facing an upper direction of the vehicle for removably inserting the beverage container therein, a first opening disposed between the container holder and the second end of the duct pipe, and a second opening facing toward the front-rear direction of the vehicle.

11 Claims, 9 Drawing Sheets

(56) References Cited

U.S. PATENT DOCUMENTS

| | | | |
|---|---|---|---|
| 2008/0296923 A1* | 12/2008 | Hirata | B60R 7/06 |
| | | | 296/37.12 |
| 2010/0019115 A1* | 1/2010 | Schimmeyer | B60N 3/104 |
| | | | 248/311.2 |
| 2021/0380170 A1 | 12/2021 | Wilmot et al. | |

FOREIGN PATENT DOCUMENTS

| | | | | |
|---|---|---|---|---|
| WO | WO-2004039629 A1 * | 5/2004 | | B60H 1/34 |
| WO | WO-2007066196 A2 * | 6/2007 | | B60N 3/104 |

* cited by examiner

BEVERAGE CONTAINER HOLDER ASSEMBLY FOR VEHICLE

BACKGROUND

For the convenience for a vehicle driver, a container holder is configured in a vehicle for holding different types of beverage containers in the vehicle. In a conventional container holder, the temperature of the beverage container contained by the container holder may be greatly influenced by the surrounding environments or an operation temperature of the vehicle. Hence, the temperature of the beverage inside of the beverage container belonging to passengers in the vehicle cannot be well kept during the time that the passengers travel with the vehicle. Hence, providing an efficient way to well keep the temperature of the beverage container to enhance tastes of the beverages in different seasons of the year or in different traveling environments of the vehicle becomes an issue to be resolved.

SUMMARY

According to an embodiment of the disclosure, a beverage container holder assembly is adapted to be utilized in a vehicle for accommodating a beverage container. The beverage container holder assembly includes a duct pipe and a container holder. The duct pipe is disposed in front of an instrument panel of the vehicle. A first end of the duct pipe is connected to an air conditioner. The container holder is connected to a second end of the duct pipe opposite to the first end. The container holder includes a recessed pocket facing an upper direction of the vehicle for removably inserting the beverage container therein, a first opening disposed between the container holder and the second end of the duct pipe, and a second opening facing toward the front-rear direction of the vehicle. The first opening faces toward an inside of the vehicle from the container holder along a width direction of the vehicle. The air generated from the air conditioner flows through the duct pipe, enters the container holder through the first opening for flowing around the beverage container, and exits the container holder through the second opening along the front-rear direction of the vehicle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the critical dimensions of the various features may be arbitrarily increased or reduced for clarity of discussion.

DETAILED DESCRIPTION

Figure 1A:
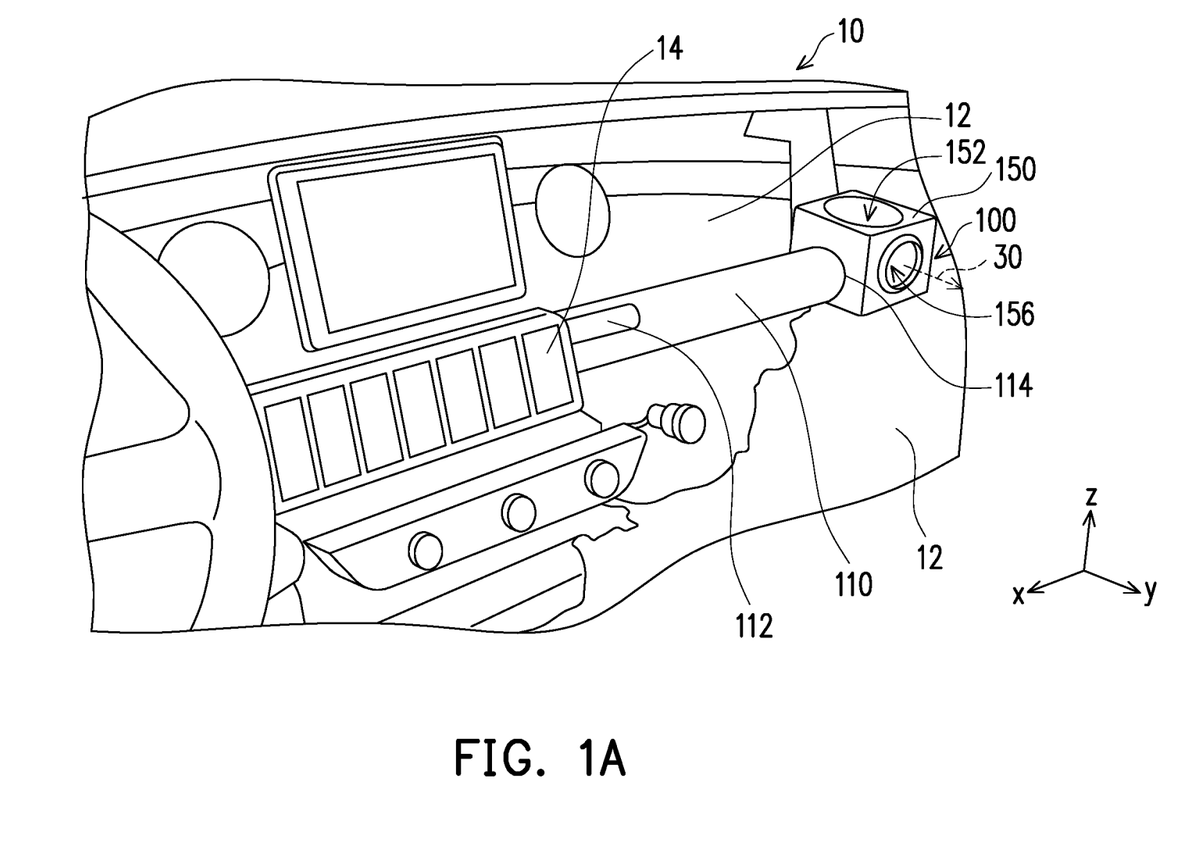
FIG. 1A is a schematic view showing a beverage container holder assembly in accordance with an embodiment of the disclosure.
Figure 1B:
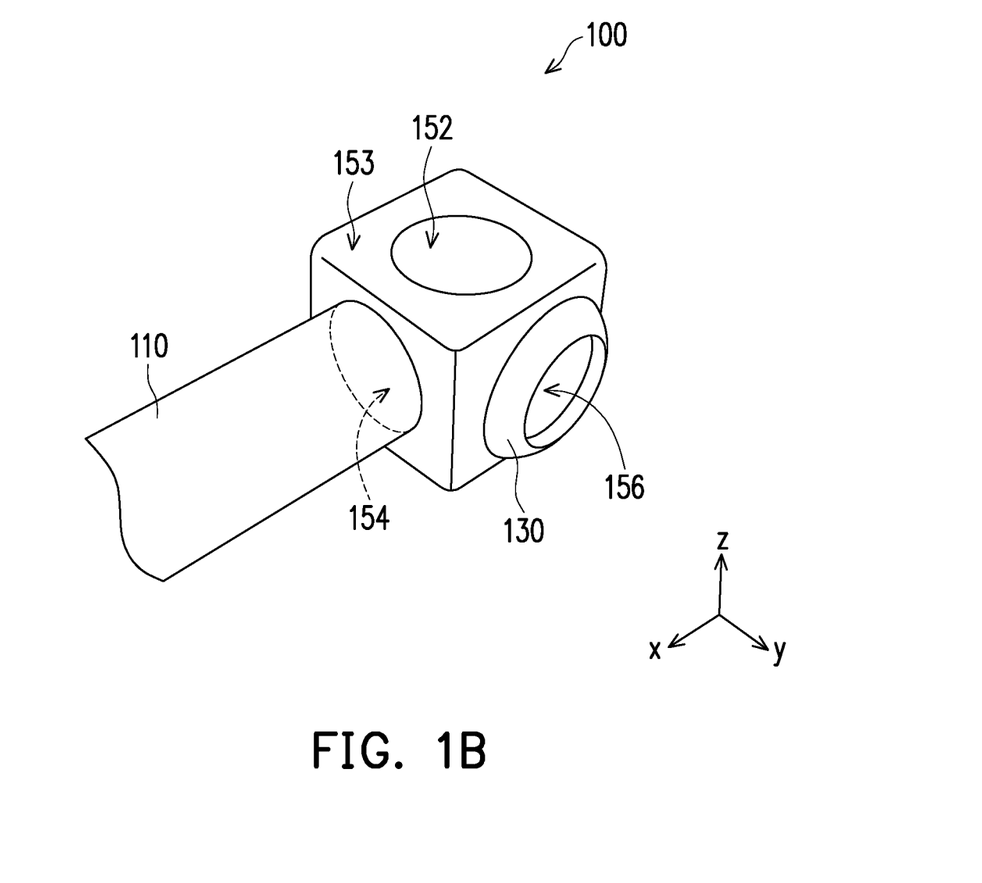
FIG. 1B is a schematic view showing an enlargement portion of FIG. 1A having a container holder connected with a duct pipe in accordance with an embodiment of the disclosure.
Figure 2:
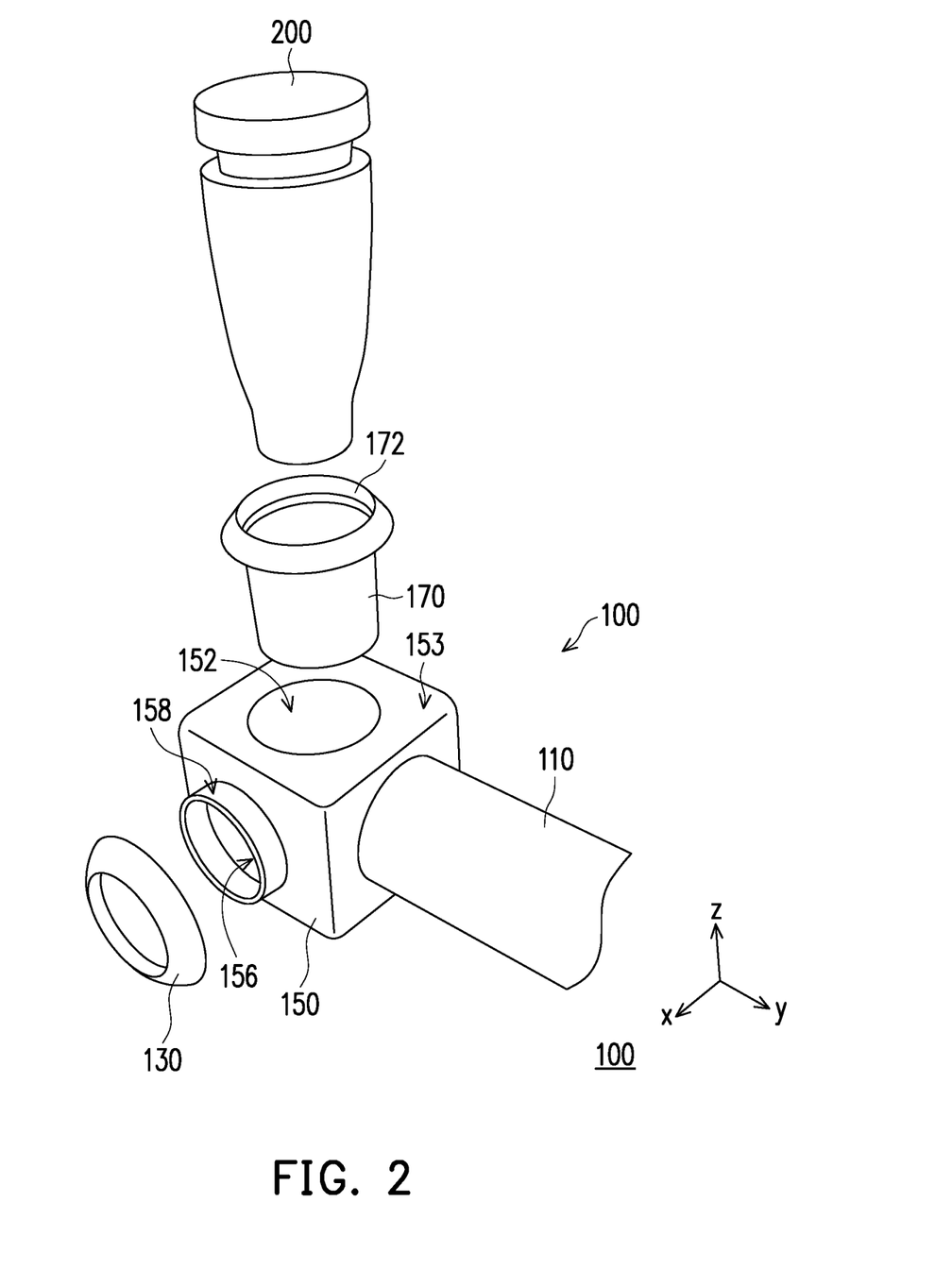
FIG. 2 is a schematic view showing a beverage container holder assembly in accordance with an embodiment of the disclosure.
Figure 3:
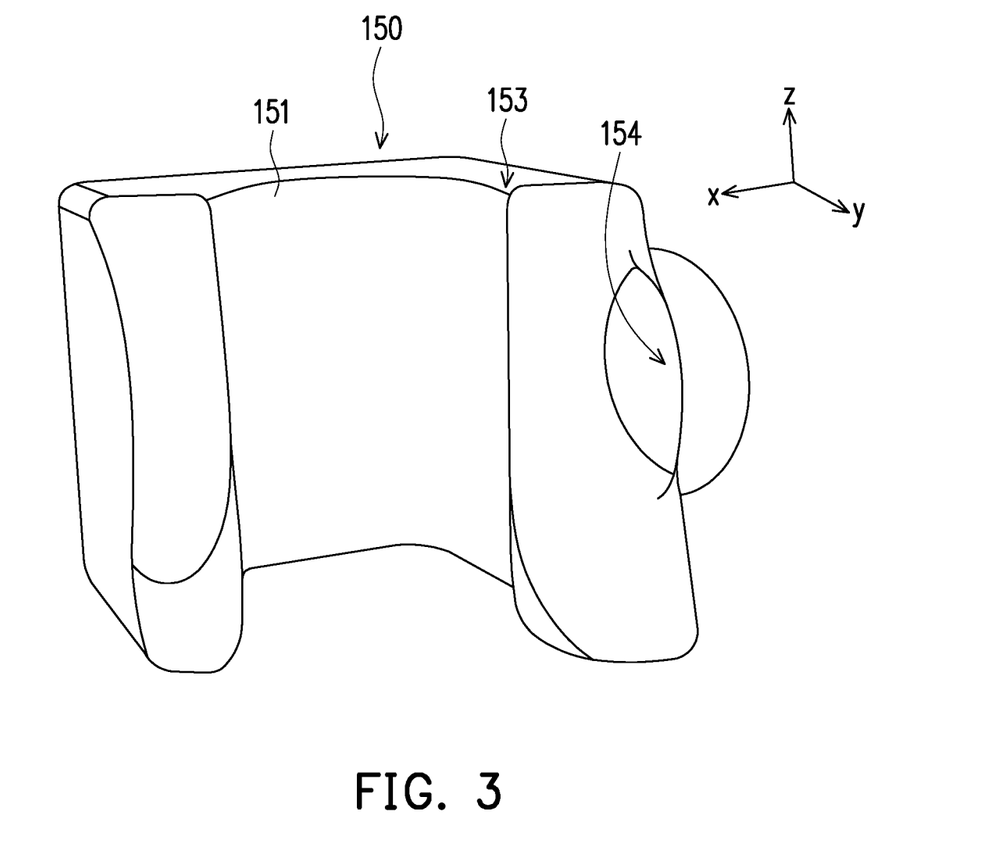
FIG. 3 is a schematic cross-sectional view showing a container holder of a beverage container holder assembly in accordance with an embodiment of the disclosure.

FIG. 1A and FIG. 2 are schematic views showing a beverage container holder assembly 100 in accordance with an embodiment of the disclosure. FIG. 1B is a schematic view showing an enlargement portion of FIG. 1A having a container holder 150 connected with a duct pipe 110 in accordance with an embodiment of the disclosure. FIG. 3 is a schematic cross-sectional view showing a container holder 150 of a beverage container holder assembly 100 in accordance with an embodiment of the disclosure.

Referring to FIG. 1A, FIG. 11B, and FIG. 2, in some embodiments, a beverage container holder assembly 100 is adapted to be utilized in a vehicle 10 for accommodating a beverage container 200. The beverage container holder assembly 100 includes a duct pipe 110 and a container holder 150. The duct pipe 110 may be disposed in front of an instrument panel 12 of the vehicle 10. In some embodiments, the duct pipe 110 may be extended along a direction perpendicular to a front-rear direction of the vehicle 10, that is, a width direction of the vehicle 10 (i.e., x-direction in FIG. 1A), but the present disclosure is not limited herein. In some other embodiments not illustrated, the duct pipe 110 may have different extension directions based on practical configurational needs of different types of vehicles. In the present embodiment, the vehicle 10 may be a heating, ventilation, and air cooling (HVAC) truck, a HVAC van, a sport utility vehicle (SUV), or a sedan. As shown in FIG. 1A, a first end 112 of the duct pipe 110 is connected to an air conditioner 14 which generates air to flow along a longitudinal direction of the duct pipe 110.

The container holder 150 is connected to a second end 114 of the duct pipe 110 opposite to the first end 112 of the duct pipe 110. The container holder 150 has a recessed pocket 152 facing an upper direction of the vehicle 10 (i.e., z-direction in FIG. 1A) for removably inserting the beverage container 200 therein. Referring to FIG. 1B and FIG. 3, the container holder 150 has a first opening 154 disposed between the container holder 150 and the duct pipe 110 for receiving the air generated from the air conditioner 14. In the present embodiment, the first opening 154 is disposed to face toward an inside of the vehicle 10 from the container holder 150 along the width direction of the vehicle 10 (x-direction shown in FIG. 1A and FIG. 1B). In addition, referring again to FIG. 2, the container holder 150 has a second opening 156, facing toward the front-rear direction of the vehicle 10 (y direction in FIG. 1A and FIG. 1B), configured as outlet of the air generated from the air conditioner 14 and flowing through the container holder 150.

In the current embodiment, the air generated from the air conditioner 14 flows through the duct pipe 110 along the longitudinal direction thereof, enters the container holder 150 through the first opening 154 to flow around the periphery of the beverage container 200, and exits the container holder 150 through the second opening 156 along the front-rear direction of the vehicle 10 (i.e., y-direction in FIG. 1A, FIG. 1B, and FIG. 2).

In the present embodiment, as air flowing through the container holder 150, the beverage container 200 accommodated in the container holder 150 may take a role as a flow guider to guide the air flowing around the periphery thereof. Through the air generated from the air conditioner 14 flowing around the container holder 150, the beverage container 200 may be heated up or cooled down based on set temperatures of the air conditioner 14. Moreover, through the above configuration of the beverage container holder assembly 100, as the air generated from the air conditioner 14 of the vehicle 10, whether cooled air or heated air, flows to an interior of the vehicle 10 for adjusting temperature therein for the comfort of vehicle drivers and passengers in different outdoor temperatures or different weather environments, the beverage container 200 placed by the vehicle drive or passengers in the container holder 150 can be simultaneously cooled down or heated up for efficiently warm keeping or cold insulating the temperatures of the beverages served in the beverage container 200.

In the present embodiments, as the beverage container 200 is removably inserting into the container holder 150 through the recessed pocket 152, the air escaped toward the upper direction of the vehicle 10 may be blocked by the beverage container 200, and thus the airflow generated from the air conditioner 14 can be all guided toward the front-rear direction of the vehicle 10. Therefore, an efficiency of the air conditioner 14 in cooling or warming the interior space of the vehicle 10 and comfort of the vehicle passengers in the vehicle 10 can be both further enhanced.

In the present embodiment, the duct pipe 110 may be disposed in front of the instrument panel 12 of the vehicle 10 in a passenger's side. Moreover, by the configuration of the first opening 154 of the container holder 150, which faces toward the inside of the vehicle 10 from the container holder 150 along the width direction of the vehicle 10 (x-direction shown in FIG. 1A), a length of the airflow path from the air conditioner 14 to the container holder 150 may be curtailed. Hence, the length of the duct pipe 110 can be shortened, the travel distance of the airflow between the air conditioner 14 and the container holder 150 can be reduced, and thus loss of coolness or heat of the air generated from the air conditioner 14 due to a distant traveling path of the air flow, outside environmental temperature, or heat generated from operation of the vehicle 10 can be further mitigated. Therefore, insulation of the temperature of the airflow generated from the air conditioner 14 can be enhanced before reaching the container holder 150 for cooling or warming the beverage container 200. As shown in FIG. 1, even though the details of the instrument panel 12 is not fully illustrated, in some embodiments, the instrument panel 12 may be provided to conceal the duct pipe 110 from a passenger sitting in the passenger side of the vehicle 10.

As shown in FIG. 1A to FIG. 3, in the present embodiment, due to configuration of container holder 150 having the first openings 154 and the second openings 156 respectively utilized as the inlet and outlet of the airflow generated from the air conditioner 14, the airflow may flow through the container holder 150 and then exit the container holder 150 from the second opening 156 thereof to reach an interior space of the vehicle 10. Hence, there is no needs of further configuring a second outlet for the airflow flowing into the interior space of the vehicle 10 through a pipe branched from the duct pipe 110 to form an air flow path independent from the air flow path to the container holder 150. Hence, in the present embodiment, complexity and difficulty of installation of the beverage container holder assembly 100 can be alleviated.

Referring to FIG. 1A and FIG. 2, in the current embodiment, the recessed pocket 152 has a circular shape for fitting the beverage container 200 but not limited herein. In some other embodiments not illustrated, the recessed pocket 152 may have a rectangular shape for fitting a beverage container having a square tubular shape. In the present amendment, the shape of the recessed pocket 152 of the container holder 150 may be adjusted in compliance with the peripheral shape of the beverage container 200.

Figure 4:
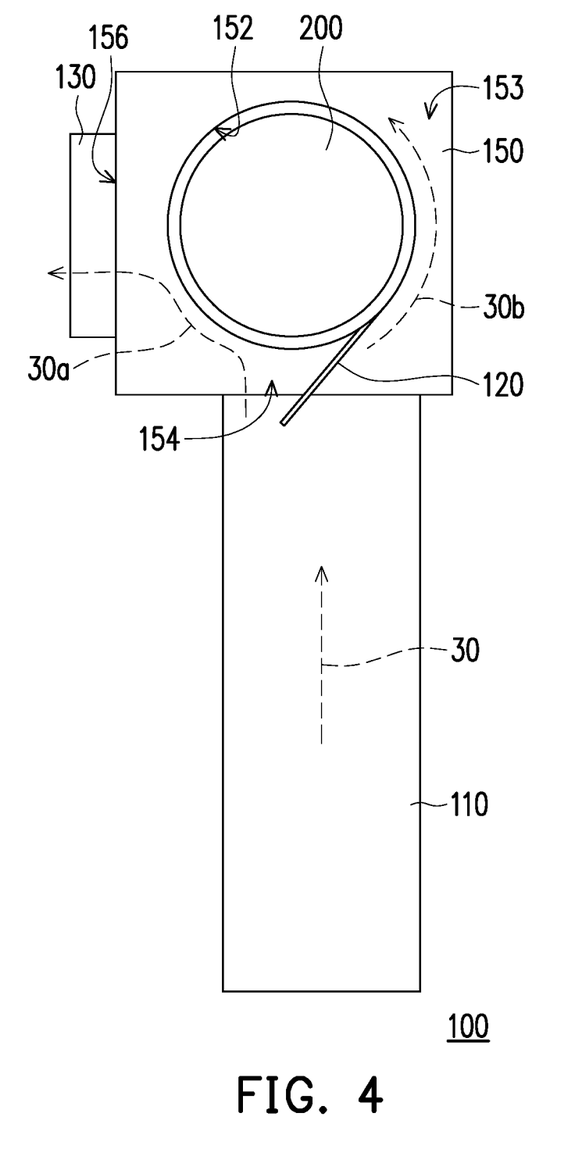
FIG. 4 is a schematic view showing a beverage container holder assembly in accordance with an embodiment of the disclosure.

FIG. 4 is a schematic view showing a beverage container holder assembly 100 in accordance with an embodiment of the disclosure. In the present embodiment, the beverage container holder assembly 100 may further includes a guiding fin 120 disposed on the airflow path 115 in the duct pipe 110 to branch the airflow 30 into at least two airflows along different paths at the first opening 154 of the container holder 150. As shown in FIG. 4, after the airflow being branched by the guiding fin 120, the airflow 30 is branched into a first airflow 30a and a second airflow 30b. As shown in FIG. 4, the first airflow 30a flows along a portion of the periphery of the beverage container 200 and exits the container holder 150 from the second opening 156 of the container holder 150.

Referring again to FIG. 4, the second airflow 30b is guided by the guiding fin 120 to flow around the rest portion of the periphery of the beverage container 200 and converged with the first airflow 30a at the second opening 156 before exiting the container holder 150. In the present embodiment, the first airflow 30a and the second airflow 30b together may flow around all the periphery of the beverage container 200. Through configuring the guiding fin 120, the airflow 30 from the duct pipe 110 can be uniformly guided to flow around all the periphery of the beverage container 200 inserted from the recessed pocket 152 of the container holder 150, such that the beverage container 200 can be evenly cooled down or heated up through the airflow 30 generated from the air conditioner 14 shown in FIG. 1A.

The number of the guiding fin 120 is not limited to the above embodiment, in some other embodiment not illustrated, based on the different applications, a plurality of guiding fins 120 may be respectively disposed around the first opening 154 of the container holder 150 to guide and branch the airflow 30 into airflows flowing along different directions.

As shown in FIG. 2 and FIG. 4, in some embodiments, the beverage container holder assembly 100 may further include a flow guider 130 connected to the second opening 156 of the container holder 150 to guide the first airflow 30a and the second airflow 30b converged at the second opening 156 and exiting therefrom based on the needs of the vehicle driver or the vehicle passengers. In some other embodiment not illustrated, the flow guider 130 may be also disposed with the fan blade or outlet fan for guiding the first airflow 30a and the second airflow 30b converged at the second opening 156 before exiting the container holder 150.

In some embodiments, as shown in FIG. 2, the container holder 150 may further include a cylindrical protrusion portion 158 protruded from the second opening 156. Moreover, the flow guide 130 may be detachably engaged with the cylindrical protrusion portion 158 for firmly fixing the flow guider 130 on the container holder 150. In some embodiments, based on the practical needs of the vehicle driver or for aesthetic design, the flow guide 130 may be replaced to meet the above requirements.

Referring again to FIG. 2, in some embodiments, the beverage container holder assembly 100 may further include a fixture structure 170, which may comply with a peripheral shape of the beverage container 200, to removably hold the beverage container 200 in the recessed pocket 152 of the container holder 150. As shown in FIG. 2, the fixture structure 170 may have a protrusion portion 172 protruded from the upper periphery of the container holder 150 for engaging with a top surface 153 of the container holder 150. In the present embodiment, as shown in FIG. 2, the fixture structure 170 may have a cylindrical shape but not limited herein. The shape of the fixture structure 170 may be complied with the beverage container 200 for firmly fitting the fixture structure 170 in the recessed pocket 152 of the container holder 150 and blocking the air to be escaped from the recessed pocket 152 toward the upper direction of the vehicle 10. In some embodiments, the container holder 150 and the fixture structure 170 may be integrally formed.

In the present embodiment, through removably fitting the beverage container 200 by the fixture structure 170 to the container holder 150, risk of spilling beverages contained in the beverage container 200 into the duct pipe 110 due to vehicle shaking during traveling may be further reduced. In addition, the fixture structure 170 may block and prevent the air flowing from the duct pipe 110 being escaped from the recessed pocket 152 toward the upper direction of the vehicle 10.

Referring again to FIG. 3, in the present embodiment, the container holder 150 may include an accommodating space 151 in the recessed pocket 152 for accommodating the beverage container 200 therein. The air generated from the air conditioner 14 flows through the accommodating space 51 to flow around the periphery of the beverage container 200 for heating up or cooling down the temperature of the beverage container 200.

In some embodiments not illustrated, depending on the types of the vehicles, the beverage container holder assembly 100 may be configured at different positions in relative to the instrument panel 12 of the vehicle 14. For example, in a HVAC truck (not shown), the duct pipe 110 and the container holder 150 may be disposed above than an instrument panel of the HVAC truck along an upper direction of the HVAC truck. Through disposing a beverage container holder assembly 100 above the instrument panel, a space in front of the instrument panel may be saved for a leg room at the passenger's side in the HVAC truck.

Figure 5:
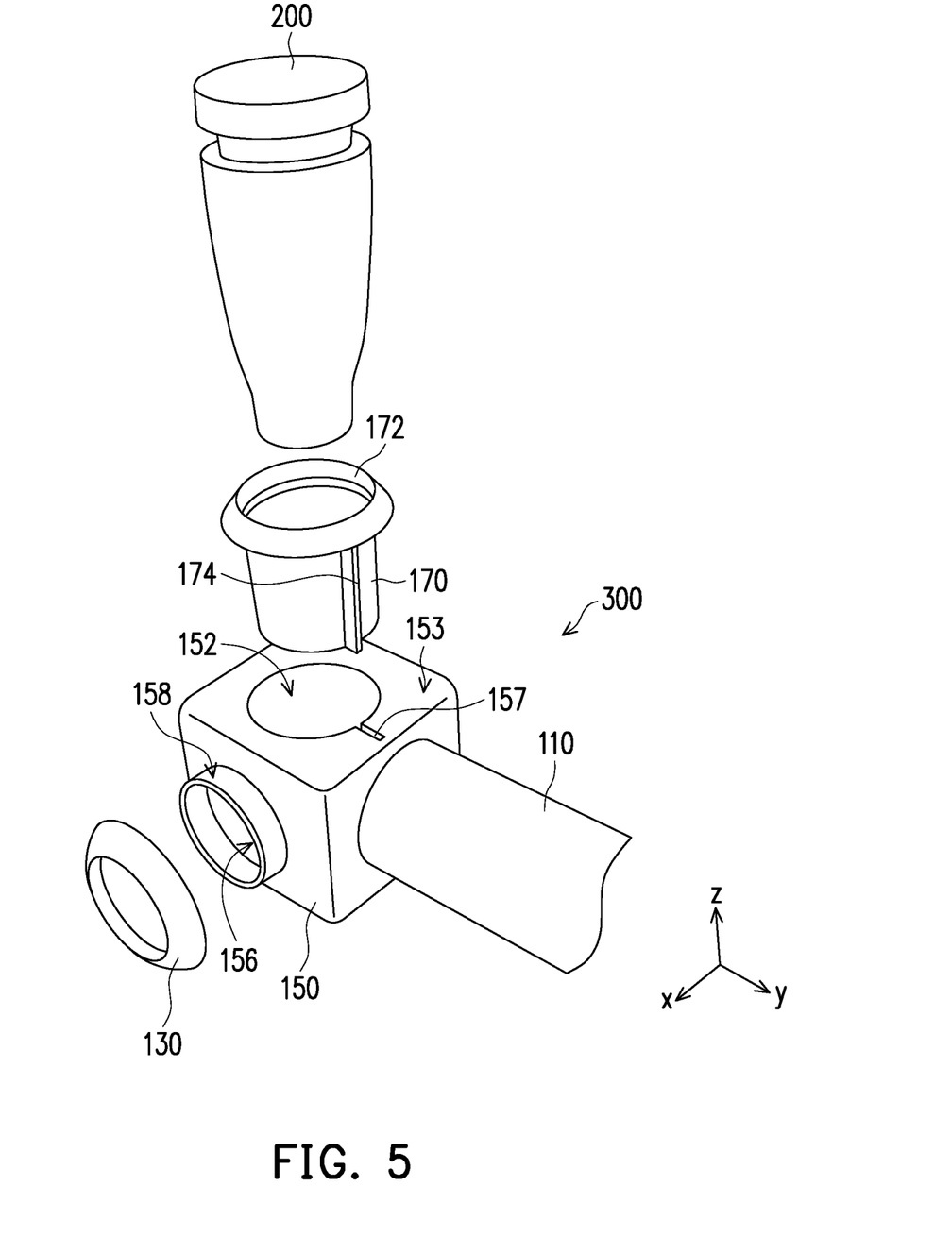
FIG. 5 is a schematic view showing a beverage container holder assembly in accordance with an embodiment of the disclosure.

FIG. 5 is a schematic view showing the beverage container holder assembly 300 in accordance with an embodiment of the disclosure. Referring to FIG. 5, in the present embodiment, the fixture structure 170 for removably fixing the beverage container 200 may further include a fixing fin 174. The fixing fin 174 is extended from the fixture structure 170 along a radial direction thereof for branching and guiding the airflow generated from the air conditioner 14 to flow around the periphery of the beverage container 200 along different flowing directions.

Moreover, in the present embodiment, a recess 157 may be correspondingly disposed in the container holder 150. The recess 157 is extended along a redial direction of the recessed pocket 152 and connected thereto for accommodating the fixing fin 174 of the fixture structure 170 therein. In some embodiments, the fixing fin 174 of the fixture structure 170 may also take a role as a splitter for splitting the airflow 30 generated from the air conditioner 14 of the vehicle 10.

Figure 6:
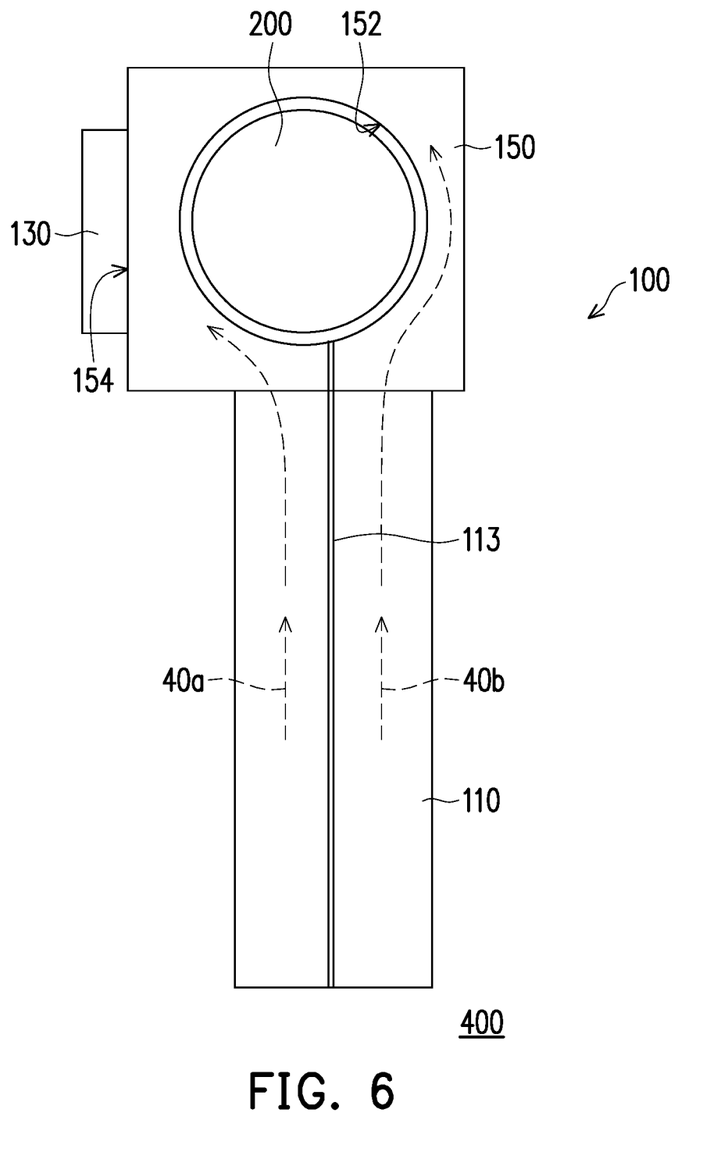
FIG. 6 is a schematic view showing the beverage container holder assembly in accordance with an embodiment of the disclosure.

FIG. 6 is a schematic view showing the beverage container holder assembly 400 in accordance with an embodiment of the disclosure. Comparing to the previous embodiments, referring to FIG. 6, the beverage container holder assembly 400 in the present embodiment may include a compartment wall 113 disposed with the duct pipe 110. As shown in FIG. 6, the compartment wall 113 is extended along a longitudinal direction the duct pile 110 to reach the container holder 150 for splitting the air generated from the air conditioner 14 shown in FIG. 1A into different two airflows 40a and 40b flowing respectively along opposite sides of the compartment wall 113. In the present embodiment, depending on the configurational position of the compartment 113 wall in relative to the duct pipe 110, for example in relative to a central axis (not shown) of duct pipe 110, the ratio between the volumes of the airflows 40a and 40b can be properly adjusted. Namely, the airflow rates of the airflows 40a and 40b along different paths extended along a longitudinal direction of the compartment wall 113 may be further adjusted based the practical needs. In some other embodiments not illustrated, the compartment wall 113 may have curved shape at the end inserted through the first opening 154 of the container holder 150 to guide the airflow into a specific flowing direction, for example, guiding the airflow generated from the air conditioner 14 toward different side walls of the container holder 150.

Figure 7:
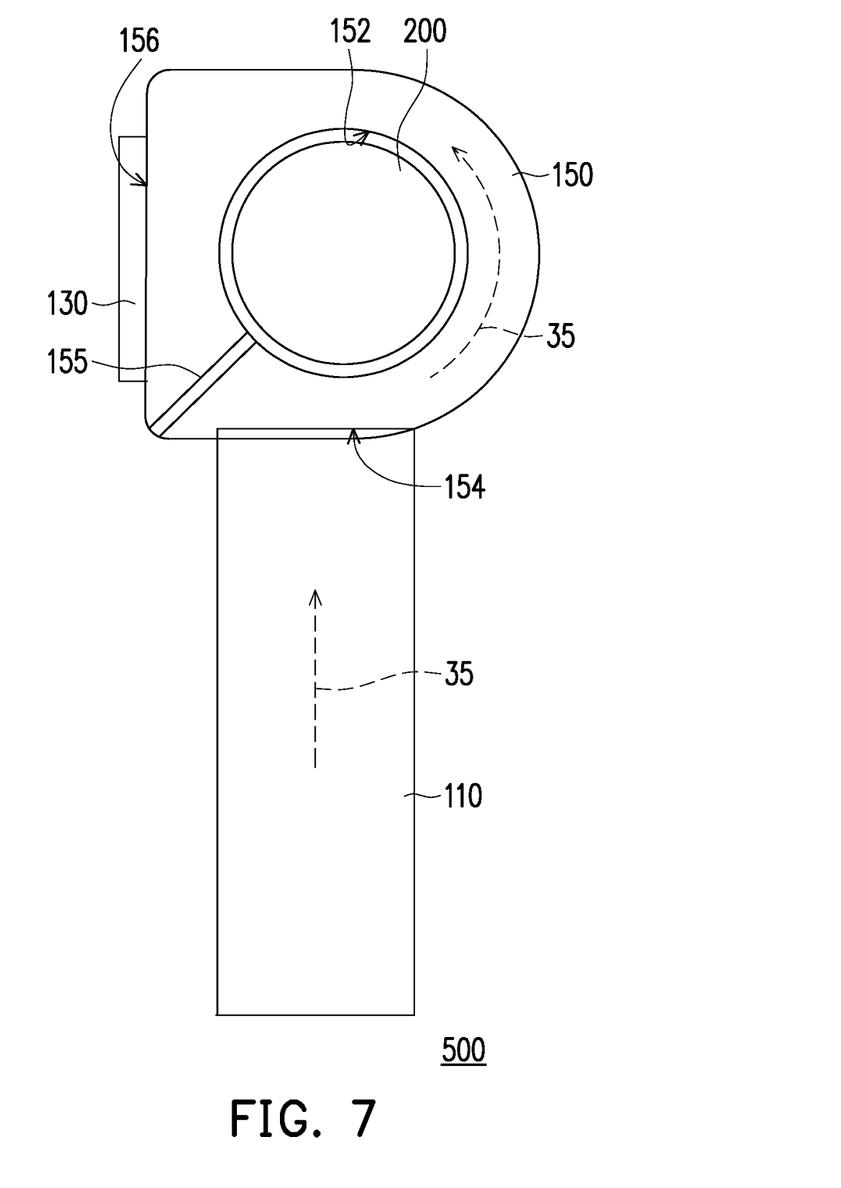
FIG. 7 is a schematic view showing the beverage container holder assembly in accordance with an embodiment of the disclosure.

FIG. 7 is a schematic view showing a beverage container holder assembly 500 in accordance with another embodiment of the disclosure. Referring to FIG. 7, comparing the beverage container holder assembly 500 with the beverage container holder assemblies 100, 300, and 400 in the previous embodiments, the container holder 150 in the beverage container holder assembly 500 may include a flow blocker 155 disposed on an airflow path within the container holder 150 between the first opening 154 and the second opening 156. As shown in FIG. 7, the flow blocker 155 may fully block the airflow entering the container holder 150 to directly reach the second opening 156 without flowing around the periphery of the beverage container 200. In the present embodiment, after the airflow entering the container holder 150 through the first opening 154, the airflow blocked by the flow blocker 155 can flow along a direction, opposite to a direction toward the flow blocker 155, to fully surround the periphery of the beverage container 200. Comparing to the previous embodiments, in the present embodiment, all the airflows entering the container holder 150 from the duct pipe 110 have to flow around the entire periphery of the beverage container 200 prior to exiting the container holder 150 through the second opening 156 thereof.

Figure 8:
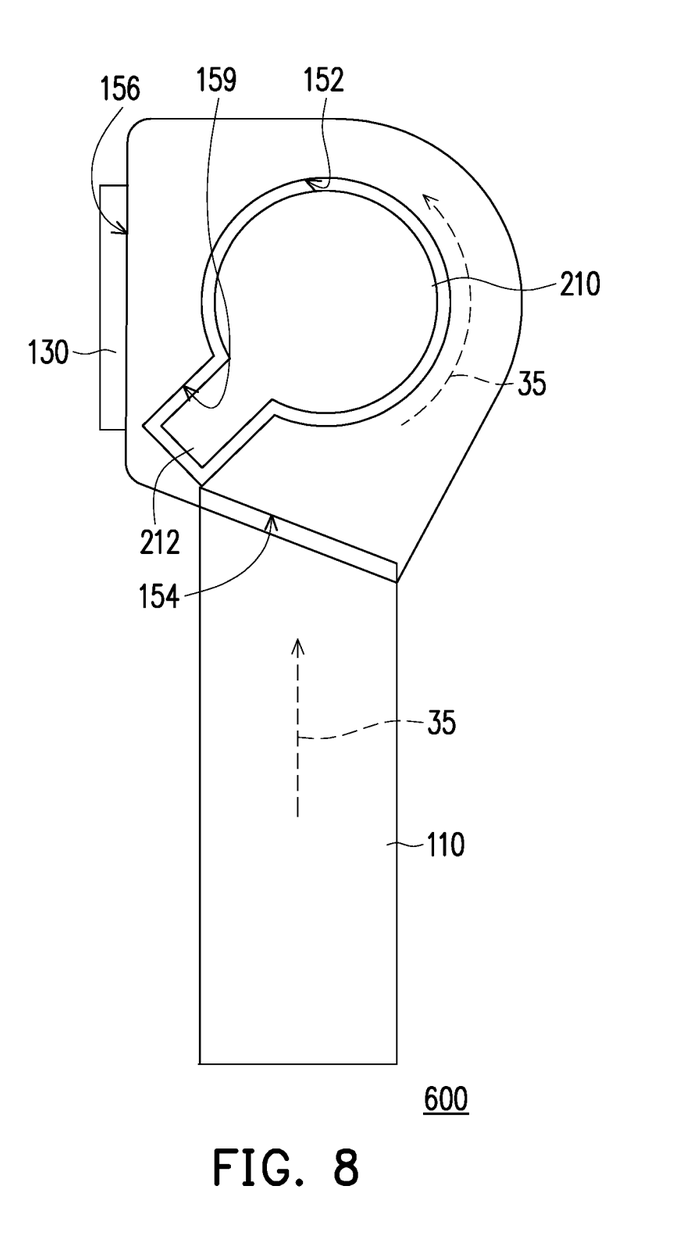
FIG. 8 is a schematic view showing a beverage container holder assembly in accordance with another embodiment of the disclosure.

FIG. 8 is a schematic view showing a beverage container holder assembly 600 in accordance with another embodiment of the disclosure. Referring to the beverage container holder assembly 600 shown in FIG. 8, the current embodiment of the disclosure is different from the above embodiments in that the container holder 150 of the beverage container holder assembly 600 may include an accommodating recess 159 connected to the recessed pocket 152, and the accommodating recess 159 is extended therefrom.

In the present embodiment, a beverage container 210 having a handle 212 can be deposited into the container holder 150 having the accommodating recess 159 for removably fitting the handle 212 therein. In the present embodiment, as the beverage container 210 placed into the container holder 150, the handle 212 of the beverage container 210 can be utilized to block a portion of the airflow entering the container holder 150 from the first opening 154. As shown in FIG. 8, the airflow blocked by the handle 212 of the beverage container 210 travels along the flowing direction 35 to flow around the periphery of the beverage container 210.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A beverage container holder assembly, adapted to be utilized in a vehicle for accommodating a beverage container, comprising:
    a duct pipe, disposed in front of an instrument panel of the vehicle, wherein a first end of the duct pipe is connected to an air conditioner; and
    a container holder, connected to a second end of the duct pipe opposite to the first end,
    wherein the container holder comprises:
        a recessed pocket facing an upper direction of the vehicle for removably inserting the beverage container therein,
        a first opening disposed between the container holder and the second end of the duct pipe, and the first opening facing toward an inside of the vehicle from the container holder along a width direction of the vehicle, and
        a second opening facing toward a front-rear direction of the vehicle,
        wherein air generated from the air conditioner flows through the duct pipe, enters the container holder through the first opening for flowing around the beverage container, and exits the container holder through the second opening along the front-rear direction of the vehicle.

2. The beverage container holder assembly in claim 1, further comprising a guiding fin disposed in the first opening for branching the air to flow toward different directions.

3. The beverage container holder assembly in claim 1, further comprising a fixture structure disposed in the container holder for blocking and preventing air flowing from the duct pipe being escaped from the recessed pocket toward the upper direction of the vehicle without flowing around a periphery of the beverage container.

4. The beverage container holder assembly in claim 3, wherein the fixture structure and the container holder are integrally formed.

5. The beverage container holder assembly in claim 3, wherein the fixture structure includes a fixing fin extending from the fixture structure along a radial direction thereof for branching and guiding the air to flow around the beverage container through different flow directions.

6. The beverage container holder assembly in claim 5, wherein the container holder comprises a recess extending along a radial direction of the recessed pocket and connected thereto for correspondingly accommodating the fixing fin as the fixture structure is deposited in the container holder.

7. The beverage container holder assembly in claim 1, wherein the container holder comprises an accommodating space in the recessed pocket for accommodating the beverage container therein, wherein the air generated from the air conditioner flows through the accommodating space for heating up or cooling down the temperature of the beverage container.

8. The beverage container holder assembly in claim 1, further comprising a flow guider disposed in the second opening for guiding the air existing from the second opening.

9. The beverage container holder assembly in claim 1, wherein the container holder further comprising an accommodating recess extending along a radial direction of the recessed pocket to accommodate a handle of the container holder.

10. The beverage container holder assembly in claim 1, further comprising a compartment wall disposed within the duct pipe, wherein the compartment wall is extended along a longitudinal direction of the duct pipe to reach the container holder for splitting the air generated from the air conditioner into different airflows.

11. The beverage container holder assembly in claim 1, wherein the container holder comprises a flow blocker disposed therein for guiding the air generated from the air conditioner to flow around the beverage container.

* * * * *